(12) United States Patent
Gilbert et al.

(10) Patent No.: US 8,144,846 B2
(45) Date of Patent: Mar. 27, 2012

(54) SYSTEM AND METHOD FOR INTERRUPTING A TRANSMITTING COMMUNICATION UNIT IN A COMMUNICATION SYSTEM

(75) Inventors: John M. Gilbert, Hawthorn Woods, IL (US); Gary P. Hunsberger, Schaumburg, IL (US); Daniel J. McDonald, Cary, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1480 days.

(21) Appl. No.: 11/620,776

(22) Filed: Jan. 8, 2007

(65) Prior Publication Data

US 2008/0167062 A1 Jul. 10, 2008

(51) Int. Cl.
*H04M 11/00* (2006.01)
(52) U.S. Cl. ............... 379/93.02; 455/518; 455/90.2; 455/78; 455/88; 455/450; 455/509
(58) Field of Classification Search ........... 455/518, 455/90.2, 78, 88, 450, 509; 379/93.01, 93.02, 379/93.04, 93.08
See application file for complete search history.

(56) References Cited

U.S. PATENT DOCUMENTS

| 5,483,670 | A * | 1/1996 | Childress et al. ............ 455/515 |
| 7,343,171 | B2 * | 3/2008 | Saeed et al. ............... 455/518 |
| 2004/0032853 | A1 | 2/2004 | D'Amico | |
| 2004/0203667 | A1 | 10/2004 | Schroeder | |
| 2006/0008078 | A1 * | 1/2006 | El-Fishawy ............... 379/432 |

FOREIGN PATENT DOCUMENTS

| EP | 1505844 B1 | 9/2010 |
| WO | 2006129985 A1 | 12/2006 |

OTHER PUBLICATIONS

PCT International Search Report Dated Mar. 7, 2008 for Counterpart Application.
PCT Preliminary Report on Patentability Dated Jul. 23, 2009 for Counterpart Application.
Australian Rejection Dated May 28, 2006 for Counterpart Application.
Canadian Rejection Dated Sep. 13, 2011 for Counterpart Application.

* cited by examiner

*Primary Examiner* — Olisa Anwah
(74) *Attorney, Agent, or Firm* — Terri Hughes Smith; Kenneth A. Haas

(57) ABSTRACT

A system and method for interrupting a transmitting communication unit in a communication system. When a call is first initiated, the call is assigned to a communication channel and broadcast from a base site using the assigned communication channel. If it is determined that a transmitting communication unit should be interrupted, a zone controller signals a base site to generate an interrupt message. The base site generates an interrupt message containing an identification code for the transmitting communication unit and broadcasts the interrupt message on an outbound link of the communication channel. The transmitting communication unit, while transmitting on an inbound link of the communication channel, continuously monitors the outbound link. If the transmitting communication unit receives, on the outbound link, an interrupt message containing an identification code matching its own identification code, the transmitting communication unit stops transmitting.

15 Claims, 4 Drawing Sheets

SYSTEM AND METHOD FOR INTERRUPTING A TRANSMITTING COMMUNICATION UNIT IN A COMMUNICATION SYSTEM

TECHNICAL FIELD OF THE DISCLOSURE

This disclosure relates generally to communication systems, and more particularly, to a system and method for interrupting a transmitting communication unit in a communication system.

BACKGROUND OF THE DISCLOSURE

Communication systems typically include a plurality of dispatch consoles and communication units, such as mobile or portable radio units, that are geographically distributed among various base sites and dispatch sites. The communication units wirelessly communicate with the base sites and each other, and are often logically divided into various talkgroups. Communication systems may be organized as trunked systems, where a plurality of radio frequency (RF) communication resources are allocated amongst multiple users or groups by assigning the base sites and RF channels within a coverage area on a call-by-call basis, or as conventional (non-trunked) systems where RF communication resources are dedicated to one or more users or groups. In trunked systems, or in mixed trunked and conventional systems, there is usually provided a central controller/server (sometimes called a "zone controller") for allocating RF communication resources among a group of sites. The zone controller may reside within a single device or multiple devices and may be located at a fixed equipment site or may be distributed among the base sites.

Calls among the communication units are typically of the dispatch type, or better known as push-to-talk (PTT). Each time a communication unit is keyed to begin a call, the call is assigned to an available wireless channel. The originating communication unit begins transmitting on the assigned channel and continues to transmit on the assigned channel until the communication unit has been dekeyed by the user. Other communication units in an associated talkgroup also switch to the assigned channel and begin listening to the call.

In current communication systems where communication units operate in a half-duplex mode, a transmitting communication unit is not capable of receiving any signals or commands from a base site while it is transmitting. This often results in a problem if there is a need to stop a communication unit from transmitting before it has dekeyed. For example, if a dispatch operator needs to transmit an urgent call, there is no way to signal the transmitting communication unit to stop transmitting and listen to the call from the dispatch site. Similarly, if another communication unit needs to transmit an emergency call on this particular channel, the emergency call either has to be postponed until the originating communication unit has dekeyed or transmitted simultaneously with the call from the originating communication unit. The former results in an undesired delay in transmitting the emergency call while the latter often results in significant interference between the two calls.

Accordingly, there is a need for a system and method for interrupting a transmitting half-duplex communication unit during the transmission of a call.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE DISCLOSURE

The present disclosure provides a system and method for interrupting a transmitting communication unit in a communication system. When a call is first initiated, the call is assigned to a communication channel. This is accomplished by sending a channel grant signal to a base site. Upon receiving the channel grant signal, the base site begins broadcasting the call on the communication channel. The base site also advertises the channel assignment to communication units in range of the base site. Authorized communication units then begin transmitting and/or receiving the call on the communication channel.

If it is determined that a transmitting communication unit should be interrupted, a zone controller signals a base site to generate an interrupt message. The base site generates an interrupt message containing an identification code for the transmitting communication unit and broadcasts the interrupt message on an outbound link of the communication channel.

The transmitting communication unit, while transmitting on an inbound link of the communication channel, continuously monitors the outbound link. If the transmitting communication unit receives, on the outbound link, an interrupt message containing an identification code matching its own identification code, the transmitting communication unit stops transmitting. The communication channel may then be used for another call.

Figure 1:
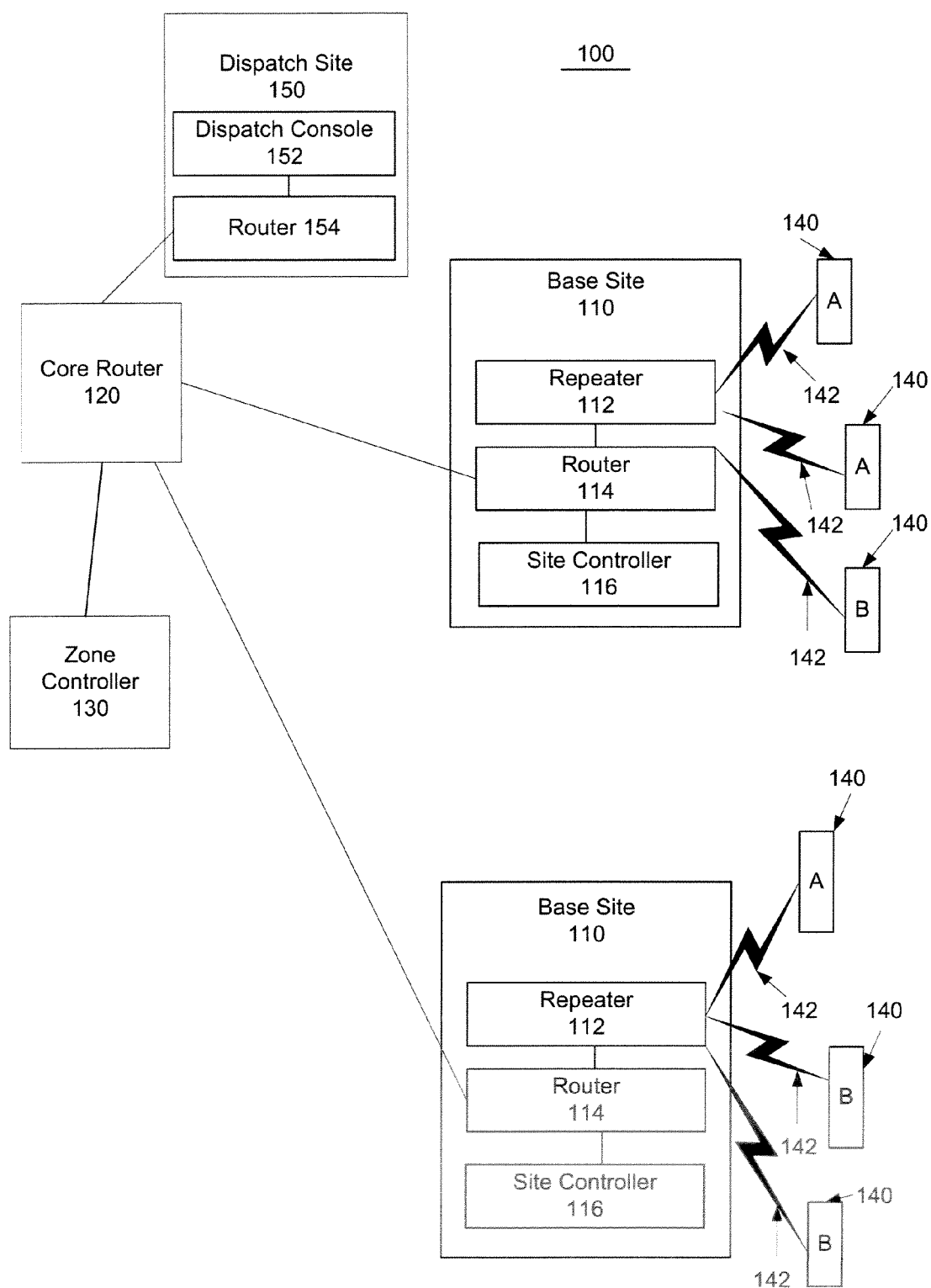
FIG. 1 shows one embodiment of a communication system according to the present disclosure.

Let us now discuss the present disclosure in greater detail by referring to the figures below. FIG. 1 shows one embodiment of a communication system 100 according to the present disclosure. The system 100 comprises a plurality of base sites 110 that are in communication with a core router 120. The core router is also coupled to a zone controller 130. The zone controller 130 manages and assigns Internet Protocol (IP) multicast addresses for payload (e.g., voice, data, video, etc.) and control messages between and among the various base sites 110. The zone controller 130 is also responsible for assigning call channels at the base sites 110.

Each base site 110 includes at least one repeater 112 that communicates, using wireless communication resources 142, with communication units 140 within a specific coverage area. Each repeater 112 is also coupled, for example, via Ethernet, to an associated router 114, which is in turn coupled to the core router 120. Each router 114 may also be coupled to a site controller 116 configured to handle call channel assignments for its respective base site 110 in the event the base site 110 is unable to communicate with the zone controller 130

The communication units 140 may be mobile or portable wireless radio units, cellular radio/telephones, video terminals, portable computers with wireless modems, or any other wireless devices. In accordance with the present disclosure, the communication units 140 are also configured to operate in a half-duplex mode, whereby each communication unit 140 is only capable of either transmitting or receiving at a given instant. The communication units 140 may also be arranged into talkgroups having corresponding talkgroup identifications as known in the art. In FIG. 1, two separate talkgroups are illustrated, identified by labels "A" and "B." However, any number of talkgroups having corresponding talkgroup identifications may be established within the system 100.

The core router 120 may also be further coupled to a dispatch site 150. The dispatch site 150 includes at least one dispatch console 152 that is coupled, for example, via Ethernet to a router 154, which is in turn coupled to the core router 120. Dispatch sites can affiliate with either or both talkgroups "A" and "B" and, accordingly, may be considered members of both talkgroups "A" and "B." Although not shown in FIG. 1, it will be appreciated that a single site may include both repeaters and dispatch consoles. In one embodiment, the base sites 110, the core router 120, the zone controller 130 and the dispatch site 150 may be coupled using T1 lines, E1 lines, fiber optic lines, wireless links, Ethernet links, or any other suitable means for transporting data between the various components.

Practitioners skilled in the art will appreciate that the system 100 may also include various other elements not shown in FIG. 1. For example, although one dispatch site and two base sites are illustrated, the system 100 may include any number of dispatch sites and base sites. The system 100 may include remote sites configured to provide simulcast transmissions. The system 100 may also be linked to a public switched telephone network (PSTN), a paging network, a facsimile machine, or the like. The communication system 100 may also be connected to a number of additional content sources, such as the Internet or various Intranets.

The wireless communication resources 142 used for communication between the base sites 110 and the communication units 140 may include any type of communication resource such as, for example, RF technologies, including, but not limited to TDMA, code division multiple access (CDMA), frequency division multiple access (FDMA), and the like. Other wireless technologies, such as those now known or later to be developed and including, but not limited to, infrared, Bluetooth, electric field, electromagnetic, or electrostatic transmissions, may also offer suitable substitutes.

Figure 2:
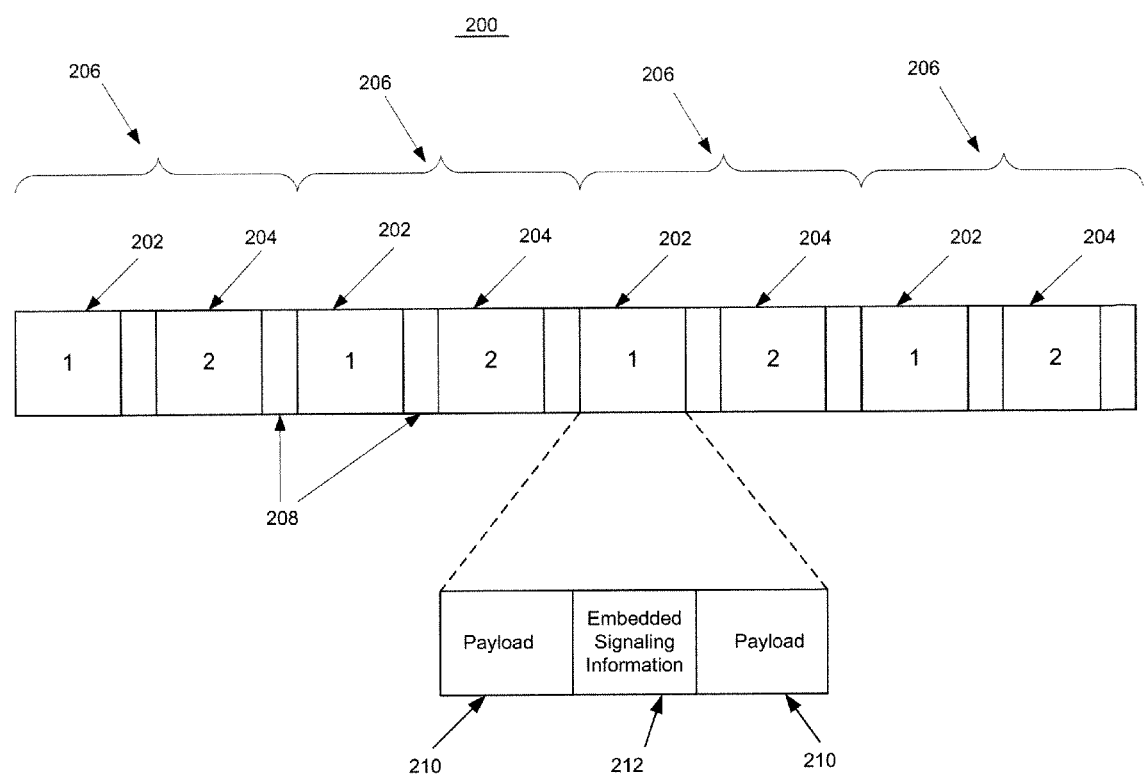
FIG. 2 shows one embodiment of a time division multiple access (TDMA) signal that may be used to transmit call information in the system of FIG. 1.

FIG. 2 illustrates one exemplary embodiment of a TDMA signal that may be used for transmitting call information in accordance with the present disclosure. Generally, each frequency carrier in a TDMA signal is divided into numerous time slots or communication streams. In FIG. 2, the TDMA signal is illustrated having two time slots. However, it is understood that a TDMA signal in accordance with the present disclosure could also have any number of time slots, such as 4, 8, 16 or any other potential number of time slots.

The 2-slot TDMA frame 200 is divided into two separate time slots, which are respectively labeled as "1" and "2." Each time slot is then further divided into discrete information packets (also referred to as "bursts") 202 and 204 corresponding to a specific amount of information. For example, each burst 202 and 204 in a Motorola ASTRO TDMA compliant system is approximately 27.5 ms long and represents about 60 ms of voice information.

The bursts 202 from the first time slot 1 and the bursts 204 from the second time slot 2 are interleaved and offset in time such that only bursts from a single time slot are transmitted at any one time. A single TDMA frame 206 is defined as comprising one burst from each time slot 1 and 2.

As shown in FIG. 2, sub-slots 208 may also be provided between each of the bursts. For outbound signals, the sub-slots 208 typically include a common announcement channel (CACH) signal for channel management as well as call control signaling.

Each time slot 202, 204 is further comprised of a payload 210 and an embedded signaling information field 212 centered within the payload 210. The payload 210 may include call information such as voice, data, video, or the like. The embedded signaling information field 212 may include various types of embedded signaling information such as synchronization patterns, error correction information, link control signals, or the like. If the payload 210 is encrypted, the embedded signaling information 212 may also include message indicator (MI) encryption synchronization words, key identification information, or algorithm identification information. The function of these types of embedded signaling information is well known in the art and is therefore not discussed in any more detail herein.

When a communication unit 140 is keyed to initiate a call, the zone controller 130 assigns the call to an available wireless communication channel. In one embodiment, the communication channel may be comprised of an outbound link for transmissions from the base site 110 to communication units 140 and an inbound link for transmissions from the communication units 140 to the base site 110. For example, in a TDMA system, the outbound link may be comprised of one or more time slots (also referred to as outbound time slots) and the inbound link may be comprised of one or more time slots (also referred to as inbound time slots). The time slots used for the inbound and outbound links may also be on the same frequency channel or on different frequency channels.

The channel assignment is then advertised to the communication units 140 via one or more communication channels. In one exemplary embodiment, the channel assignment may be advertised via a dedicated control channel that is used by one or more base sites 110 for transmitting various call initiation signals and identification codes. In other embodiments, however, the communication system may not include a dedicated control channel, in which case, communication traffic may be delivered on any communication channel in the communication system.

Upon receiving the channel assignment, the communication unit 140 which requested the call begins transmitting call information to the base site 110 using the inbound link of the communication channel. Other communication units 140 authorized to receive the transmitted call (i.e., communication units in the same talkgroup) also obtain the channel assignment and begin listening to the call on the outbound link of the communication channel. For purposes of this disclosure, a communication unit 140 that is transmitting on the inbound link is referred to as a transmitting communication unit while a communication unit 140 that is listening on an outbound link is referred to as a receiving communication unit. In accordance with the present disclosure, the transmitting communication unit is also configured to monitor the outbound link while transmitting on the inbound link. More particularly, in a TDMA system, the transmitting communication unit transitions to an outbound time slot during the times when the transmitting communication unit is not transmitting on an inbound time slot, and obtains the embedded signaling information from the TDMA bursts broadcast on the outbound time slot.

Figure 3:
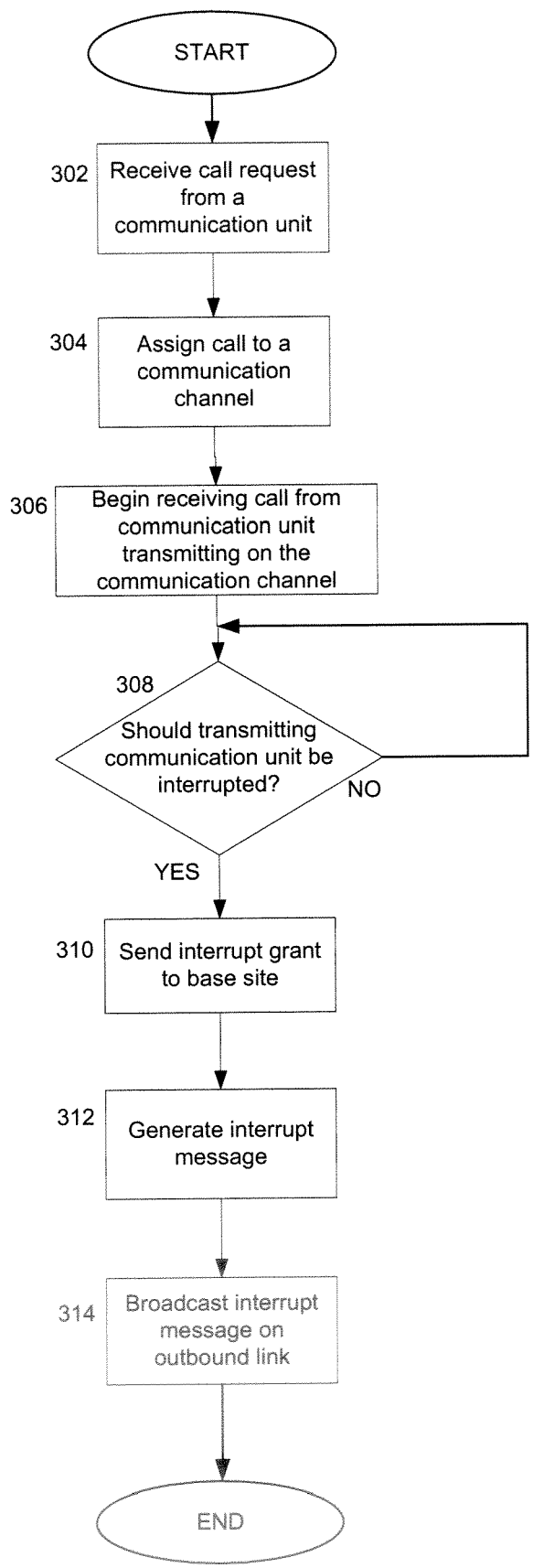
FIG. 3 is a flow chart illustrating one embodiment of a method for generating and transmitting an interrupt message according to the present disclosure.

According to one exemplary embodiment of the present disclosure, FIG. 3 illustrates one embodiment of a method for interrupting a call being transmitted by a communication unit on an inbound time slot. The term "call", as used herein, may include any type of multimedia transmission (such as voice, data, or video), as well as transmissions comprising system control information.

In step 302, a call request is received from a keyed communication unit. The call request is routed to the zone controller 130 and a communication channel is assigned to the call in step 304. The channel assignment is advertised to the communication units 140 and the base site 110 begins receiving the call from the transmitting communication unit on the inbound link of the assigned communication channel in step 306. Although not illustrated in FIG. 3, it is understood that the base site 110 also begins broadcasting the call on the outbound link of the assigned communication channel.

In step 308, the zone controller 130 determines whether to interrupt a transmitting communication unit. There are numerous scenarios where it may be desirable to interrupt the transmitting communication unit. For example, in one embodiment, a dispatch operator at a dispatch site 150 may command that the transmitting communication unit be interrupted in order to transmit a priority call from the dispatch site 150. The transmitting communication unit may also be interrupted if an emergency call is being transmitted by another communication unit 140 in the same talkgroup. In another embodiment, the transmitting communication unit may be interrupted if a higher-priority communication unit in the same talkgroup keys a call. In yet another embodiment, the transmitting communication unit may also be interrupted so that the channel being used by the transmitting communication unit can be reassigned to a higher priority call from another talkgroup. Of course, these are provided merely as examples, and it should be understood that there may be numerous other scenarios where it would be desirable to interrupt the transmitting communication unit.

In the event of a dispatch takeover, it may also be desirable in some instances to allow a transmitting communication unit to continue transmitting on the inbound link. The dispatch operator can then continue listening to the transmitting communication unit while the dispatch site is sourcing the outbound call. Accordingly, in one embodiment, the dispatch operator, when initiating a dispatch call, may manually indicate whether a transmitting communication unit should be interrupted or whether the transmitting communication unit should continue transmitting. In another embodiment, the zone controller 130 may also be configured to automatically determine whether to interrupt a transmitting communication unit based on the type of call that is to be transmitted. For example, the zone controller 130 may cause a transmitting communication unit to be interrupted upon receiving an urgent call from another communication unit but allow the transmitting communication unit to continue transmitting upon receiving an urgent call from a dispatch site 150.

If the zone controller 130 determines that the transmitting communication unit should not be interrupted, no action is taken and the process returns to step 308. If the zone controller 130 determines that the transmitting communication unit should be interrupted, the process proceeds to step 310.

In step 310, the zone controller 130 sends an interrupt grant to the base site 110. Upon receiving the interrupt grant, the base site 110 generates an interrupt message in step 312. The interrupt message is configured to signal the transmitting communication unit to stop transmitting. The interrupt message may also include an identification code corresponding to an identification code for the transmitting communication unit that is to be interrupted. In this way, the interrupt message can be targeted at a specific communication unit in the communication system 100. If multiple communication units are to be interrupted, the interrupt message may also include multiple identification codes or a single identification code configured to address multiple communication units. Additionally, the interrupt message may also be an "all call" message configured to cause any transmitting communication unit receiving the interrupt message to be interrupted.

In one embodiment, the interrupt message may be in the form of a link control signal. For example, in an Association of Public Communications Officers (APCO) Project 25 TDMA system, the interrupt message may be in the form of a LC_CALL_TRM_CAN message. In one embodiment, the LC_CALL_TRM_CAN message may be configured to signal a communication unit receiving the message to dekey from the call and switch over to the control channel. Alternatively, the LC_CALL_TRM_CAN message may also be configured to signal a communication unit receiving the message to switch directly into a receiving mode. Of course, while the LC_CALL_TRM_CAN message is provided as one example of a link control signal that may be used in accordance with the present disclosure, it should be understood that other types of link control signals may also be used.

The base site 110 broadcasts the interrupt message to the communication units 140 on the outbound link in step 314. In one embodiment of a TDMA system, the interrupt message may be broadcast within the embedded signaling information field of a TDMA burst on an outbound time slot. For example, in an embodiment where an outbound time slot is transmitting a clear call (i.e., not encrypted), the interrupt message may be embedded in place of another link control signal in the TDMA burst. In an embodiment where an outbound time slot is transmitting a secure call (i.e., encrypted), the interrupt message may instead be embedded in place of a MI encryption synchronization word in the TDMA burst. Of course, it should be understood that the interrupt message may also be used to replace other types of embedded signaling information. The interrupt message may also be transmitted either entirely within a single TDMA burst or, alternatively, broken up into portions and transmitted on multiple TDMA bursts. The interrupt message may also be transmitted multiple times to better ensure that it is received by the transmitting communication unit.

Figure 4:
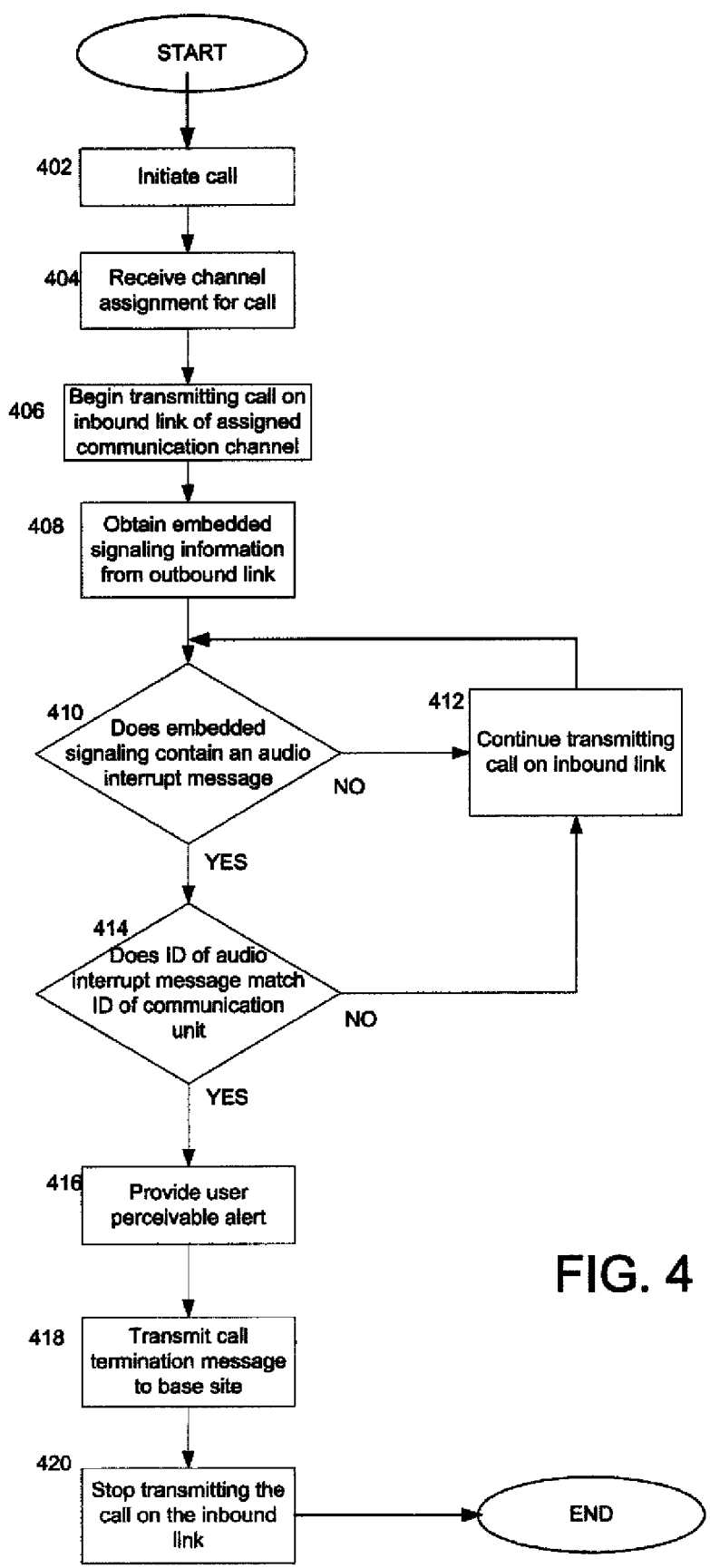
FIG. 4 is a flow chart illustrating one embodiment of a method for receiving and processing an interrupt message according to the present disclosure.

According to the present disclosure, each communication unit 140 is configured to detect the interrupt message while in the process of transmitting a call and to stop transmitting upon detecting that the interrupt message is applicable to the particular transmitting communication unit 140. One exemplary embodiment of a method for receiving and processing the interrupt message at the transmitting communication unit is illustrated in FIG. 4.

A communication unit is keyed to initiate a call in step 402. The communication unit receives a channel assignment grant for the call in step 404 and begins transmitting the call on an inbound link of the assigned channel in step 406. The transmitting communication unit also receives the embedded signaling information from the outbound link in step 408. For example, as discussed above, this may be accomplished in a TDMA system by the transmitting communication unit transitioning to an outbound time slot during the times when the transmitting communication units is not transmitting on an inbound time slot, and obtaining the embedded signaling information from a TDMA burst on the outbound time slot.

Upon receiving the embedded signaling information, the transmitting communication unit determines whether the embedded signaling information includes an interrupt message in step 410. If no interrupt message is detected, the transmitting communication unit continues to transmit the call in step 412, and the process returns to step 410. If an interrupt message is detected, the process proceeds to step 414.

In step 414, the transmitting communication unit determines whether the interrupt message includes an identification code matching the identification code of the transmitting communication unit. If there is no match, the transmitting unit continues to transmit the call in step 412, and the process returns to step 410. If there is a match, the process proceeds to step 416. However, it should be understood that if the interrupt message is an "all call" message as described above, then the transmitting communication unit need not perform this step, and the process instead moves directly from step 410 to step 416.

In step 416, the transmitting communication unit provides a user perceivable alert to indicate to a user of the transmitting communication unit that the transmitting communication unit is about to be interrupted. The alert may be, for example, a series of beeps, a vibration, a light, or any other type of alert that may be sensed by a user of the transmitting communication unit.

In step 418, the transmitting communication unit may transmit a call termination message to the base site 110. The call termination message signals the base site 110 that the transmitting communication unit has received and processed the interrupt message. The call termination message may also be transmitted multiple times to better ensure that it is received by the base site.

In step 420, the transmitting communication unit stops transmitting. For example, upon receiving an interrupt message in the form of a LC_CALL_TRM_CAN message, the transmitting communication unit may be configured to either dekey from the call and return to the control channel, or switch directly to a receiving mode.

Once the transmitting communication unit has stopped transmitting, a new call (such as a call from a dispatch site, an emergency call from another communication unit, or the like) can be assigned to and transmitted on the same communication channel. In one embodiment, broadcasting of the new call by the base site 110 may begin a predetermined amount of time after transmission of the interrupt message. The base site 110 may alternatively be configured to begin transmission of the new call upon receiving the call termination message from the transmitting communication unit. In another embodiment, the system may also be configured to assign and begin transmission of the new call as soon as the new call is keyed in order to prevent any delays in transmitting the new call. In this instance, rather than transmitting the interrupt message before starting the new call, the interrupt message may be transmitted at the beginning of, or shortly after the beginning of, the new call.

If authorized, the communication unit that has been interrupted may also join the new call as a receiving communication unit. Thus, the present disclosure may be employed to either simply stop a transmitting communication unit from transmitting or to cause a transmitting communication unit to switch from a transmitting mode to a receiving mode.

It should also be understood that any receiving communication units that receive the interrupt message may be configured to ignore the interrupt message. As a result, the interrupt message does not compromise the ability of receiving communication units to process the call information on the outbound link. If the call being broadcast on the outbound link is a secure call and the interrupt message is transmitted in place of a MI encryption synchronization word, each of the receiving communication units may also be configured to internally advance the MI encryption synchronization word from a previous TDMA burst in order to properly decrypt the call. Various methods for internally advancing the MI encryption synchronization word are well known in the art and are therefore not discussed herein. Of course, if a communication unit enters a call late and receives an interrupt message before it has received a MI encryption synchronization word, the communication unit may remain muted until a MI encryption synchronization word is received.

In one embodiment, the communication system 100 may also be configured to broadcast interrupt messages only during clear calls in order to decrease the chance of a false interrupt. As would be understood by one skilled in the art, the MI encryption synchronization word is a constantly changing value that is used for decrypting a secure call. As such, it may be possible for the MI encryption synchronization word on a particular TDMA burst to resemble an interrupt message and cause a false interrupt message to be detected by the transmitting communication unit. Thus, in one embodiment, a base site 110 may be configured to transmit the interrupt message only if the call information being transmitted is clear.

In one embodiment, a transmitting communication unit may then be configured to evaluate whether the call information on the outbound link is clear or secure. This may be accomplished by, for example, the transmitting communication unit monitoring the algorithm identification information transmitted in TDMA bursts on the outbound link. The algorithm identification information indicates whether the specific call information being transmitted in a TDMA burst is clear or secure. As the clear or secure state of the call information being transmitted can change one or more times during a single call, the transmitting communication unit may also be configured to continuously and/or repeatedly assess whether the call information is clear or secure during the call.

If the call information is clear, the transmitting unit may process the embedded signaling information received on the outbound link as described above to determine whether an interrupt message has been received. However, if the call information is secure, the transmitting communication unit may be configured to ignore any such messages. In this way, the chance of falsely detecting an interrupt message at the transmitting communication unit can be significantly decreased.

Further advantages and modifications of the above described system and method will readily occur to those skilled in the art. For example, while the present disclosure has been described with regards to a TDMA system, it is understood that it may also be used for other types of communication systems. In the event that the zone controller 130 is not operational or otherwise unable to communicate with the base site 110, it should also be understood that processes discussed above as being performed by the zone controller 130 may also be performed by the site controller 116 at a base site 110. The transmitting communication unit may also be configured to monitor a different communication channel to detect an interrupt message rather than the outbound link of the communication channel to which it has been assigned. For example, the interrupt message may be transmitted on the control channel, a different traffic channel, or a dedicated communication channel for transmitting the interrupt message.

The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for interrupting a communication unit transmitting a call in a communication system, the method comprising:
    assigning the call to a communication channel;
    receiving the call from the communication unit on an inbound link of the communication channel;
    determining whether the communication unit should be interrupted;
    sending an interrupt grant to a base site upon determining that the communication unit should be interrupted;
    generating, at the base site, an interrupt message upon receiving the interrupt grant; and
    broadcasting the interrupt message to the communication unit;
    wherein broadcasting the interrupt message includes broadcasting the interrupt message on an outbound link of the communication channel;
    wherein the inbound link is comprised of a first time division multiple access (TDMA) time slot and the outbound link is comprised of a second TDMA time slot;
    wherein the second TDMA time slot is comprised of a plurality of TDMA bursts, and wherein broadcasting the interrupt message includes broadcasting at least a portion of the interrupt message within an embedded signaling information field of one or more of the plurality of TDMA bursts.

2. The method of claim 1 wherein the interrupt message includes an identification code corresponding to an identification code of the communication unit.

3. The method of claim 2 wherein the interrupt message is in the form of a link control signal.

4. The method of claim 1 wherein the interrupt message is broadcast in place of a link control signal on one or more of the plurality of TDMA bursts.

5. The method of claim 1 wherein the interrupt message is broadcast in place of message indicator encryption synchronization word on one or more of the plurality of TDMA bursts.

6. A method for interrupting a communication unit transmitting a call in a communication system, the method, at the communication unit, comprising:
    initiating a call;
    receiving a channel grant signal assigning the call to a communication channel;
    transmitting the call on an inbound link of the communication channel;
    determining whether an interrupt message has been transmitted by a base site;
    determining whether the interrupt message contains an identification code matching an identification code of the communication unit; and
    ceasing transmission of the call on the inbound link if the identification code contained in the interrupt message matches the identification code of the communication unit.

7. The method of claim 6 wherein determining whether the interrupt message has been transmitted by the base site includes obtaining embedded signaling information from at least one embedded signaling information field on an outbound link of the communication channel; and determining whether the embedded signaling information includes an interrupt message.

8. The method of claim 7 wherein the inbound link is comprised of a first time division multiple access (TDMA) time slot and the outbound link is comprised of a second TDMA time slot; and wherein obtaining embedded signaling information includes transitioning to the second TDMA time slot during a time when the communication unit is not transmitting on the first TDMA time slot, and obtaining the embedded signaling information from the embedded signaling information field in at least one TDMA burst in the second TDMA time slot.

9. The method of claim 6 further including providing a user perceivable alert upon determining the identification code contained in the interrupt message matches the identification code of the communication unit.

10. The method of claim 6 further including transmitting a call termination message to a base site.

11. The method of claim 6 wherein ceasing transmission of the call information includes dekeying from the call and switching to a control channel.

12. The method of claim 6 wherein ceasing transmission of the call information includes switching from a transmitting mode to a receiving mode.

13. A communication system capable of interrupting transmission of a call on a communication channel comprising;
    a controller configured to assign the call to the communication channel, and subsequently send an interrupt grant upon determining that transmission of the call should be interrupted;
    a base site coupled to the controller, the base site being configured to receive the call on an inbound link of the communication channel, to subsequently receive the interrupt grant, to generate an interrupt message upon receiving the interrupt grant, and to broadcast the interrupt message to the communication channel;
    a communication unit in wireless communication with the base site, the communication unit being configured to transmit the call on the inbound link, to determine whether the interrupt message has been transmitted from the base site, and to cease transmission of the call on the inbound link upon determining that the embedded signaling information field includes the interrupt message;
    wherein the base site is configured to broadcast the interrupt message to the communication channel within at least one embedded signaling information field on an outbound link of the communication channel, and wherein the communication unit is configured to obtain the at least one embedded signaling information field from the outbound link while transmitting the call on the inbound link, to determine whether the at least one embedded signaling information field includes the interrupt message;
    wherein the interrupt message includes an identification code, and wherein the communication unit is further configured to cease transmission of the call on the inbound link if the identification code included in the interrupt message matches an identification code of the communication unit.

14. The system of claim 13 wherein the base site is configured to transmit the call on the outbound link only if the outbound link is not encrypted.

15. The system of claim 13 wherein the communication unit is further configured to ignore the interrupt message if the outbound link is encrypted.

* * * * *

UNITED STATES PATENT AND TRADEMARK OFFICE
CERTIFICATE OF CORRECTION

| | |
|---|---|
| PATENT NO. | : 8,144,846 B2 |
| APPLICATION NO. | : 11/620776 |
| DATED | : March 27, 2012 |
| INVENTOR(S) | : Gilbert et al. |

It is certified that error appears in the above-identified patent and that said Letters Patent is hereby corrected as shown below:

In Column 3, Line 11, delete "130" and insert -- 130. --, therefor.

In Column 10, Line 38, in Claim 13, delete "comprising;" and insert -- comprising: --, therefor.

Signed and Sealed this
Twenty-fifth Day of December, 2012

David J. Kappos
*Director of the United States Patent and Trademark Office*